United States Patent [19]

Romandi

[11] Patent Number: 4,658,344

[45] Date of Patent: Apr. 14, 1987

[54] BRIDGE INVERTER HAVING SWITCHING ELEMENTS INTERCONNECTED WITH BRASS BUSBARS

[75] Inventor: Denes Romandi, Erlangen, Fed. Rep. of Germany

[73] Assignee: Siemens Aktiengesellschaft, Berlin and Munich, Fed. Rep. of Germany

[21] Appl. No.: 781,419

[22] Filed: Sep. 30, 1985

[30] Foreign Application Priority Data

Nov. 19, 1984 [DE] Fed. Rep. of Germany ....... 3442259

[51] Int. Cl.[4] .......................................... H02M 7/521
[52] U.S. Cl. ..................... 363/136; 363/58; 363/71
[58] Field of Search ................ 363/58, 71, 136–138, 363/144; 378/101, 105, 106

[56] References Cited

U.S. PATENT DOCUMENTS 3,569,819  3/1971  Martzloff et al. .................... 363/58
3,721,890  3/1973  Ettinger et al. ..................... 363/144

FOREIGN PATENT DOCUMENTS 2834561  2/1980  Fed. Rep. of Germany .
148696   6/1981  German Democratic Rep. .................................. 363/144
21495    6/1972  Japan ................................ 363/138
373463   1/1964  Switzerland .

Primary Examiner—William H. Beha, Jr.

[57] ABSTRACT

A DC-AC converter comprises a bridge of electronic switches having a load connected in one diagonal and the constant voltage source connected to the other diagonal. The two switches of each bridge branch are connected to one another by at least one resistor, the load being connected to one end of the resistor.

2 Claims, 3 Drawing Figures 4,658,344

BRIDGE INVERTER HAVING SWITCHING ELEMENTS INTERCONNECTED WITH BRASS BUSBARS

BACKGROUND OF THE INVENTION

Field of the Invention

The present invention relates to a DC-AC converter comprising a bridge of electronic switches having a load in one diagonal and a constant voltage source in the other diagonal.

Description of the Prior Art

A DC-AC converter of the type generally set forth above is disclosed in the German published application No. 28 34 561, fully incorporated herein by this reference. X-ray technology is one area of use for such a DC-AC converter. Here, the DC-AC converter can serve the purpose of feeding the high voltage transformer of an X-ray generator. In this case, the feed of the high voltage transformer occurs with a frequency lying specifically above the commercial power line frequency so that the high voltage transformer can be designed considerably lighter in weight and smaller in comparison to X-ray generators supplied directly from the commercial power lines.

The reliable quenching of the bridge short circuit by a short circuit quenching device is of considerable significance for the reliable operation of a DC-AC converter of the aforementioned type. Bridge short circuits can never be entirely excluded and can be caused, for example, by malfunctions of the X-ray tube. The aforementioned German application therefore discloses a short circuit quenching device which prevents a response of the main fusing given a sporadic misdrive of the DC-AC converter switches (thyristors) which would mean a case of service with all of its disadvantages and costs.

A quenching device of the aforementioned type, however, only operates reliably when the distribution of the short circuit current is approximately equal in the individual DC-AC converter branches. Given more than one DC-AC converter, however, i.e. given the parallel feed of the load by a plurality of DC-AC converters, for example an X-ray tube by two or more DC-AC converters connected in parallel, this uniform current distribution is difficult to realize, in particular because of the component tolerances and the parasitic inductances. Given the use of one AC-DC converter, there can already be problems with respect to the uniform distribution of the short circuit current when the undesired wiring inductance is too high.

SUMMARY OF THE INVENTION

The object of the present invention is to provide a DC-AC converter of the type generally set forth above such that a symmetrical current distribution is induced in a simple manner.

The above object is achieved, according to the present invention, in that both respective switches of a bridge branch are connected to one another by at least one resistor at whose one end the load is connected. The resistor must thereby be sufficiently large for the desired balancing of the short circuit current, but must also be sufficiently small so as to not influence the generator power and to keep the dissipated energy low. The value of resistance thereby lies on the order of a few milliohm.

According to a particular feature of the invention, the resistors can be formed of bus bars of resistor material which are provided with taps for the connection of the load. In this improvement, therefore, relatively large and expensive power resistors which would have to be additionally connected are not required, but the bus bars already required per se are fabricated of resistor material.

The balancing of the short circuit current achieved by the present invention is extremely good and a second quenching device for the second in a group of DC-AC converters for feeding a common load can be completely eliminated.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
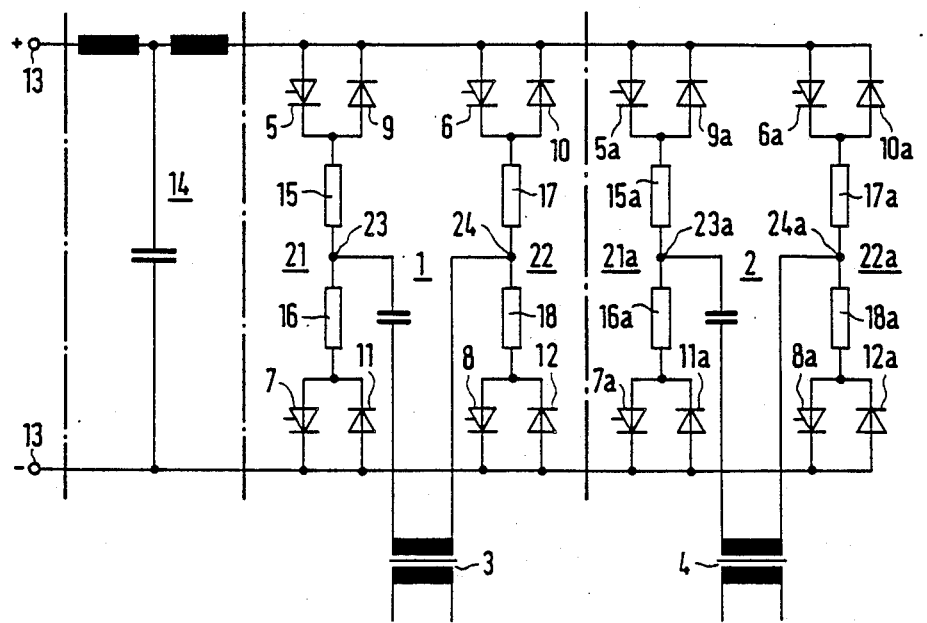
FIG. 1 is a schematic circuit diagram of a DC-AC converter constructed in accordance with the present invention.

The DC-AC converter of FIG. 1 comprises two identical DC-AC converters 1, 2 which are identically and which feed a common load, for example an X-ray tube, via two high voltage transformers 3, 4. The individual DC-AC converters 1, 2 each comprise a bridge of electronic switches 5–8 and 5a–8a in whose one diagonal the load is connected and in whose other diagonal a constant voltage source 13 is connected. The constant voltage is supplied to the individual DC-AC converters 1, 2 via a short circuit quenching device 14. The short circuit quenching device 14 thereby is connected following a filter capacitor which is connected parallel to the output of a rotary current rectifier and whose output voltage, accordingly, is supplied in parallel to the filter capacitor and to the input of the short circuit quenching device 14. The two electronic switches 5, 7 and 6, 8, as well as 5a, 7a and 6a, 8a of a bridge branch are respectively connected to one another via two resistors 15, 16, 17, 18 or, respectively, 15a, 16a, 17a, 18a of equal size to whose common point the load is connected. The resistors 15–18 and, respectively, 15a–18a thereby induce a symmetrical current distribution to the switches 5–8 and, respectively, 5a–8a.

The electronic switches 5–8 and, respectively, 5a–8a are bridged by free-wheeling diodes 9–12 and, respectively, 9a–12a.

Figure 2:
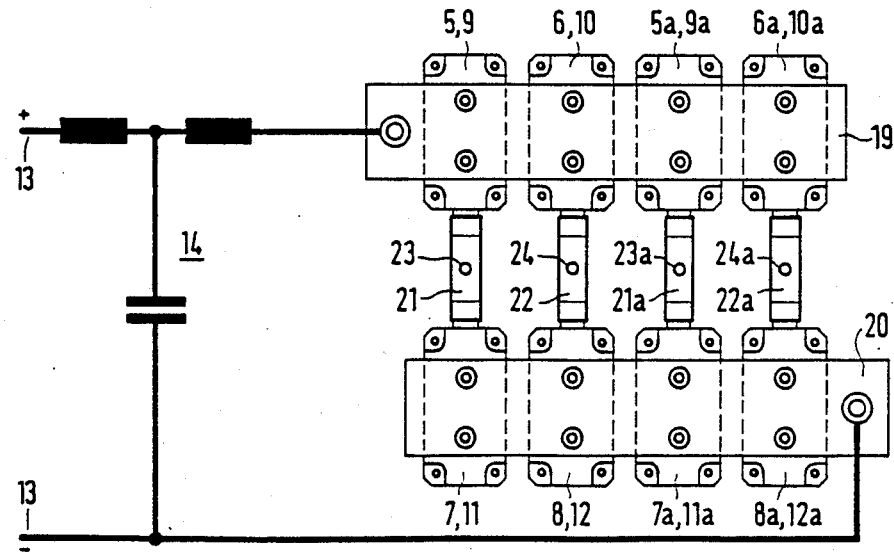
FIG. 2 is a structural design illustration of the DC-AC converter of FIG. 1.

It proceeds from FIG. 2 that the components 5–12 and, respectively, 5a–12a are located under brass busbars 19, 20 which form the common leads to these components 5–12 and, respectively, 5a–12a (positive pole and negative pole). The resistors 15–18 and, respectively, 15a–18a are thereby formed of the busbars 21, 22 or, respectively, 21a, 22a of resistor material which are provided with taps 23, 24 or, respectively, 23a, 24a for the connection of the load.

Figure 3:
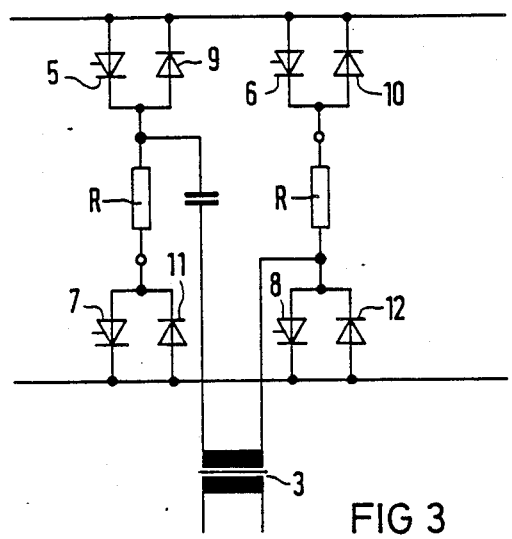
FIG. 3 is a schematic circuit diagram of a modification of the DC-AC converter of FIGS. 1 and 2.

FIG. 3 illustrates a DC-AC converter in which the two switches of each bridge branch are connected to one another via a single resistor R which has one or the other end thereof connected to the load. This circuit also enables the solution of the object of the invention for providing a symmetrical current distribution.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A DC-AC converter comprising:
    a bridge circuit including first and second diagonals, one of said diagonals adapted for connection to a load and the other diagnoal adapted for connection to a constant voltage source;
    said bridge circuit comprising a plurality of electronic switches connected serially in pairs forming respective bridge branches of said one diagonal; and
    a plurality of resistance means each serially connecting the electronic switches of a respective pair of electronic switches and each comprising a busbar including a center tap which constitutes a load terminal to provide an even distribution of resistance and a symmetrical current distribution.

2. The DC-AC converter of claim 1, wherein: each of said bushbars comprises brass.

* * * * *